United States Patent [19]
Patron

[11] Patent Number: 4,919,198
[45] Date of Patent: Apr. 24, 1990

[54] DEVICE FOR SEALING AND ABSORBING DIFFERENTIAL EXPANSION BETWEEN A CHAMBER FOR COOLING PARTICLES IN SUSPENSION AND A RECYCLING DUCT

[75] Inventor: Henri Patron, Rochefort en Yvelines, France

[73] Assignee: Societe Anonyme dite: STEIN INDUSTRIE, Velizy-Villacoublay, France

[21] Appl. No.: 360,817

[22] Filed: Jun. 2, 1989

[30] Foreign Application Priority Data

Jun. 8, 1988 [FR]  France .................. 88 07620

[51] Int. Cl.⁵ .................................. F28F 7/00
[52] U.S. Cl. .................................. 165/81; 110/204; 110/245; 122/4 D; 165/104.16
[58] Field of Search .................. 110/245, 204, 263; 431/7, 170; 165/104.16, 81, 82, 83; 122/510, 4 D; 422/139

[56] References Cited

U.S. PATENT DOCUMENTS

| | | |
|---|---|---|
| 1,626,772 | 5/1927 | Worden . |
| 4,510,892 | 4/1985 | Wincze et al. .......... 165/81 X |
| 4,641,608 | 2/1987 | Waryasz ................. 165/81 X |
| 4,676,824 | 6/1987 | Daradimos et al. ......... 75/36 |
| 4,813,479 | 3/1989 | Wahlgren ............... 165/104.16 |

FOREIGN PATENT DOCUMENTS 0192906  9/1986  European Pat. Off. .
2087750  6/1982  United Kingdom .

Primary Examiner—Edward G. Favors
Attorney, Agent, or Firm—Sughrue, Mion, Zinn, Macpeak & Seas

[57] ABSTRACT

A device for sealing and absorbing differential expansion between a cooling chamber for cooling particles in suspension and a recycling duct comprises a tubular expansion joint part (2) interconnecting the wall (1) of the cooling chamber and the recycling duct (3), with guide plates (7) for guiding the tubular part being fixed to the outside wall of the chamber and being distributed around the tubular part and bearing thereagainst by means of rolls (8, 9), a flat gasket (6) being interposed between the ends of the tubular part and the recycling duct, and controlled clamping flanges (10, 11) being disposed on the ends and being provided with oblong holes (16, 17) for passing clamping bolts (18), one of the flanges being provided with pebble-shaped parts (20) bearing against corresponding clamping adjustment shoes (22) on the other.

7 Claims, 1 Drawing Sheet

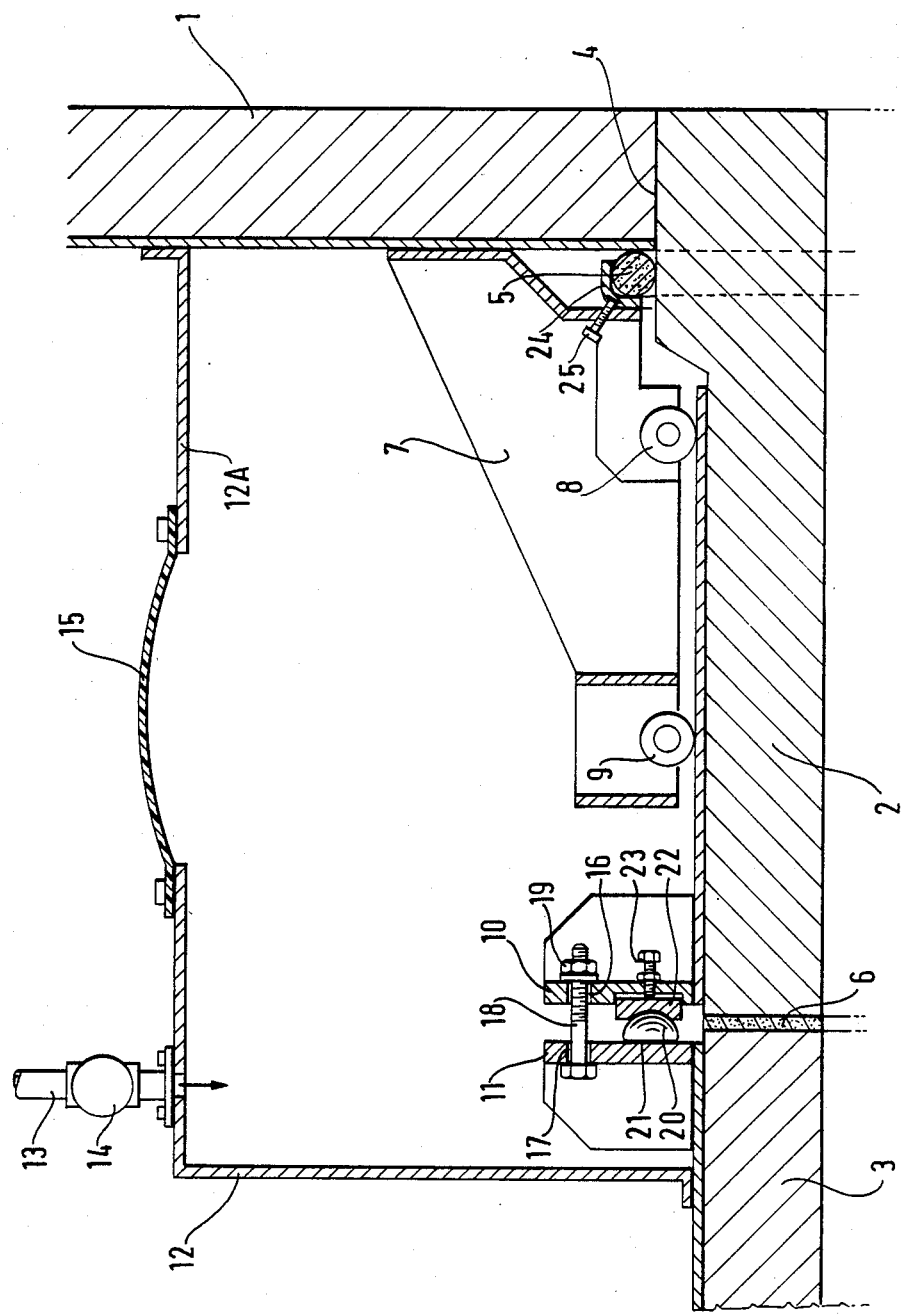

DEVICE FOR SEALING AND ABSORBING DIFFERENTIAL EXPANSION BETWEEN A CHAMBER FOR COOLING PARTICLES IN SUSPENSION AND A RECYCLING DUCT

The present invention relates to a device for sealing and absorbing differential expansion between a chamber for cooling particles in suspension in a flow of combustion gas and a duct for recycling these particles to a combustion chamber.

BACKGROUND OF THE INVENTION

The device is particularly applicable to the junction between a chamber for cooling particles by indirect heat exchange with a combustion gas and a duct for recycling said particles to the hearth of a boiler, for example in an installation implementing the method described in patent document FR-B-2323101. The boiler may be a solid fuel boiler, in particular a coal fired boiler, burning particles in a flowing fluidized bed, or it may possibly be a liquid fuel boiler.

The prior art device is constituted by a metal bellows interconnecting either the outlet orifice of the cooling chamber and the end of the recycling duct, or else two portions of said duct. However, the inside of the bellows fills up with particles relatively quickly such that after a fairly short length of time it is no longer capable of absorbing expansion, and leaks appear.

The object of the present invention is to provide a device for sealing and absorbing differential expansion which is capable of operating over very long periods of time without deteriorating, and which absorbs differential expansion equally well in all three dimensions.

SUMMARY OF THE INVENTION

The device of the invention comprises:

(a) a tubular expansion joint part interconnecting the wall of the cooling chamber and the recycling duct, the outside margin of one of the ends of the part being supported by the wall of an opening into the cooling chamber and the cross-section of the other end of the part being supported against the cross-section of the recycling duct;

(b) a plurality of guide plates for guiding the tubular part, said plates being fixed to the outside wall of the cooling chamber and being distributed around the tubular expansion joint part and resting thereagainst by means of rolls, and clamping a sealing ring against the join line between the tubular expansion joint part and the wall of the opening in the cooling chamber;

(c) a flat gasket disposed between the facing cross-sections of the tubular expansion joint part and of the recycling duct; and (d) flanges for controlled mutual clamping of the facing cross-sections of the tubular expansion joint part and of the duct, said flanges being provided with oblong holes for passing clamping bolts for allowing differential expansion to take place in two perpendicular directions, one of said flanges being provided with pebble-shaped parts each having a plane slip surface on one side facing said flange, and a surface on its other side bearing against a clamping adjustment shoe controlled by a screw passing through the other flange.

The device preferably should also includes the following features:

It includes a pressurization chamber surrounding the tubular expansion joint part and the end of the duct adjacent thereto.

The guide plates are substantially trapezoidal in shape, and include rolls close to the join line between the tubular expansion joint part and the wall of the opening in the cooling chamber, and other rolls close to the controlled clamping flanges.

The plane surface of the pebble-shaped part is provided with a hard coating which withstands rubbing.

The surface of the pebble-shaped part bearing against the shoe and the corresponding surface of the shoe are spherical.

BRIEF DESCRIPTION OF THE DRAWINGS

A device in accordance with the invention for sealing and for absorbing differential expansion is described below by way of example and with reference to the sole diagrammatic FIGURE in the accompanying drawing which is a section on a diametral plane through the device with only one of the walls of the recycling duct and of the tubular expansion joint part being shown.

DETAILED DESCRIPTION

In the FIGURE, the particle recycling duct 3 is connected to the wall 1 of the particle cooling chamber by a tubular expansion joint part 2 having one end received in an opening 4 in the wall 1.

Longitudinal differential expansion parallel to the axis of the recycling duct is made possible by a high temperature sealing ring 5 which is held in place against the contact surface between the tubular expansion joint part and the periphery of the opening in the cooling chamber by means of an angle iron 24 whose position is adjustable by a clamping screw 25. The sealing ring provides a gas-tight seal.

The tubular expansion joint part 2 is guided by generally trapezoidally shaped plates such as 7 which are fixed to the wall 1 of the cooling chamber and which bear against the expansion joint part by means of rolls 8 close to the cooling chamber and rolls 9 close to the recycling duct.

A flat high temperature gasket 6 is disposed between the end surface of the tubular expansion joint part 2 and the end surface of the recycling duct 3, and this gasket is clamped between these two surfaces by means of flanges 10 and 11 which are fixed respectively to the expansion joint and to the duct. This gasket allows differential expansion to take place in either of the two directions perpendicular to the axis of the recycling duct. The gap between the two flanges is accurately adjusted by pebble-shaped parts 20 each having a plane face 21 on one side bearing against the flange 11 and a spherical surface on the other side bearing against a hollow spherical surface in a corresponding shoe 22 whose position is adjustable by means of a screw 23. The two flanges are kept in substantially fixed relationship relative to each other by a bolt 18 passing through facing holes 16 and 17 in the two flanges, together with a clamping nut 19. The holes are oblong so as to allow differential expansion along two perpendicular directions.

In order to prevent possible leakage of particles from the recycling duct, both the sealing ring and the gasket are surrounded by an enclosure under pressure having walls 12A and 12 which are welded firstly to the wall of the particle cooling chamber and secondly to the outside of the recycling duct, which walls are interconnected by a flexible joint 15, with the enclosure being fed with air via a duct 13 and a valve 14.

I claim:

1. A device for sealing and absorbing differential expansion between a cooling chamber for cooling particles in suspension in a flow of fuel gas and a duct for recycling said particles to a combustion chamber, the device comprising:
   (a) a tubular expansion joint part interconnecting the wall of the cooling chamber and the recycling duct, the outside margin of one of the ends of the part being supported by the wall of an opening into the cooling chamber and the cross-section of the other end of the part being supported against the cross-section of the recycling duct;
   (b) a plurality of guide plates for guiding the tubular part, said plates being fixed to the outside wall of the cooling chamber and being distributed around the tubular expansion joint part and resting thereagainst by means of rolls, and clamping a sealing ring against the join line between the tubular expansion joint part and the wall of the opening in the cooling chamber;
   (c) a flat gasket disposed between the facing cross-sections of the tubular expansion joint part and of the recycling duct; and
   (d) flanges for controlled mutual clamping of the facing cross-sections of the tubular expansion joint part and of the duct, said flanges being provided with oblong holes for passing clamping bolts for allowing differential expansion to take place in two perpendicular directions, one of said flanges being provided with pebble-shaped parts each having a plane slip surface on one side facing said flange, and a surface on its other side bearing against a clamping adjustment shoe controlled by a screw passing through the other flange.

2. A device according to claim 1, also including a pressurization chamber surrounding the tubular expansion joint part and the end of the duct adjacent thereto.

3. A device according to claim 2, wherein the guide plates are substantially trapezoidal in shape, and include rolls close to the join line between the tubular expansion joint part and the wall of the opening in the cooling chamber, and other rolls close to the controlled clamping flanges.

4. A device according to claim 1, wherein the guide plates are substantially trapezoidal in shape, and include rolls close to the join line between the tubular expansion joint part and the wall of the opening in the cooling chamber, and other rolls close to the controlled clamping flanges.

5. A device according to claim 1, wherein the plane slip surface of the pebble-shaped part is provided with a hard coating which withstands rubbing.

6. A device according to claim 5, wherein the surface of the pebble-shaped part bearing against the shoe and the corresponding surface of the shoe are spherical.

7. A device according to claim 1, wherein the surface of the pebble-shaped part bearing against the shoe and the corresponding surface of the shoe are spherical.

* * * * *